May 27, 1969        J. J. DAILEY        3,445,953
FISHLURE
Filed Oct. 10, 1966
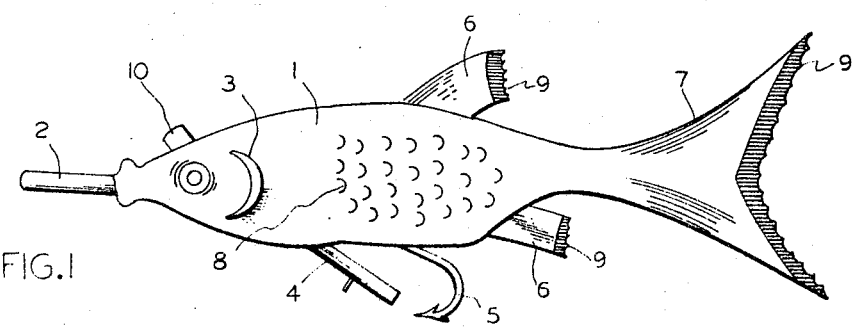
FIG.1
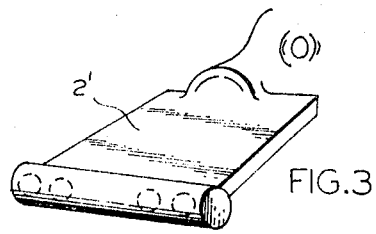
FIG.3
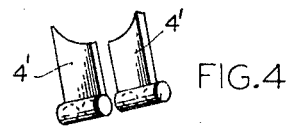
FIG.4
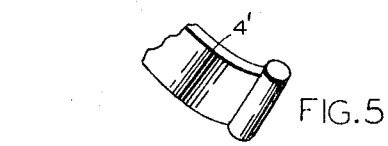
FIG.5
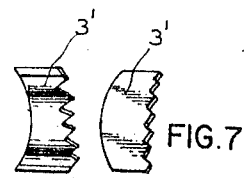
FIG.7
FIG.6
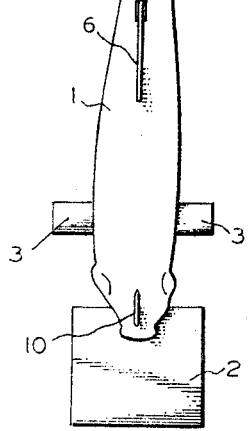
FIG.2
INVENTOR
JOHN J. DAILEY
BY *Plumley, Tyner & Sandt*
ATTORNEYS United States Patent Office 3,445,953
Patented May 27, 1969

3,445,953
FISH LURE
John J. Dailey, Box 834, Anna Maria, Fla. 33501
Filed Oct. 10, 1966, Ser. No. 585,475
Int. Cl. A01k 85/08, 85/00, 79/02
U.S. Cl. 43—42.06
4 Claims

ABSTRACT OF THE DISCLOSURE

A life-like, fish-like lure of molded, resilient plastic having a flexible flat scoop extending forwardly from the head portion and unevenly set scoops mounted on either side of and to the rear of said flat scoop and a plurality of undercut depressions on the body portion in the general formation of fish scales and an imbedded fish hook in close proximity to an integrally formed, flexible plastic bottom plane guard for said fish hook. Fin and tail portions on the fish-like lure are weighted along their rear edges by reason of greater thickness than the main area of the fin and tail portions.

---

This invention relates to artificial bait or fishing lures and more particularly to an improved fishing lure having a body made from resilient plastic or rubber-like material in a form, appearance, feel and action closely resembling that of a live fish or minnow.

In the past scores, if not hundreds, of lures have been described which were designed to imitate the appearance and action of live fish. These lures have been made of a wide variety of materials of construction including wood, metal, rubber and plastic materials and they have been painted, embossed, scented, fitted with sonic devices, cavities for fish food, flashing lights, light-reflecting scales, and a multitude of similar devices for the purpose of attracting fish.

Some of these lures have been suggested as primarily useful in surface casting, some as trolling lures and some as especially useful in deep water or jigging operations. Undoubtedly some of the previously proposed lures have been productive in the sense that their use has resulted in the catching of fish. However, none of the lures produced up to the time of the present invention has been observed to possess complete adaptability to close control in manipulation in casting and trolling, as well as jigging, so as to give a realistic resemblance to live fish action while at the same time presenting a plurality of other fish-attracting features.

It is an object of this invention to provide an improved fish lure having the physical appearance and action in use of a live fish.

It is a further object of the invention to provide an improved fish lure having the physical appearance and action in use of a live fish and having, in addition, a plurality of fish-attracting characteristics.

Other objects and advantages will be apparent from the following description and accompanying drawings.

In the accompanying drawings, FIGURE 1 is a side elevation of a lure embodying the features of the invention. FIGURE 2 is a top plan view of the lure shown in FIGURE 1. FIGURE 3 is a perspective view of a modified front scoop having a weighted forward end. FIGURE 4 is a perspective view of a modified bottom plane guard which is in split portions and weighted. FIGURE 5 is a perspective view of a portion of the modified bottom plane guard in action. FIGURE 6 is a perspective front view of a modified side scoop with serrated edges. FIGURE 7 is a perspective rear view of the modified scoop of FIGURE 6.

Referring to the drawings generally and FIGURES 1 and 2 in particular, the numeral 1 designates an elongated fish-like body, including head, eyes, fins, and tail, preferably of relatively soft, flexible elastic material such as rubber, or, preferably, other platsic material such as plasticized polyvinyl chloride. Extending forwardly from the head area is a line attaching member 10, and a flexible front scoop 2 which is an extension of and integral with the main body of the lure and which may be weighted or rounded or both at the forward end as shown in modified scoop 2′ FIGURE 3. On each side of the head area and, preferably, back of the eyes are side scoops 3 which are integral with and a part of the body 1 preferably of at least slightly concave shape and, again preferably, positioned at slightly different ditsances back from the eyes toward the tail. A flexible bottom plane 4, integral with and a part of the body 1, extends downwardly from the underpart or belly section of the body 1 at an angle from the main body axis such as 30 to 60 degrees, so as to protect a hook 5 from snagging on weeds or the like as well as to perform its other functions which will be described hereinafter. This bottom plane may be weighted or rounded or both at the end away from the main lure body as shown in FIGURES 4 and 5. The fins 6 and tail 7 are integral with and a part of the body 1 although, as will be described hereinafter, their major area is, preferably, of exceedingly thin cross-section or thickness as compared with the body 1 of which they are a part and an extension. All along the sides and back or top of the body 1 are undercut depressions or simulated scales 8. In a preferred embodiment, these undercut depressions or scales also occur on the thickened edges 9 of the fins 6 and tail 7 which edges will be described hereinafter.

Having broadly described the lure of this invention by reference to FIGURES 1 and 2 and before proceeding to a discussion of its mode of action, advantages and preferred details by reference to FIGURES 3–7 inclusive certain variations and details will be described as an aid in understanding the improvements accomplished by this invention.

Referring generally to FIGURES 1 and 2, more particularly to FIGURE 3, the flexible front scoop may be of various shapes and rounded or weighted as indicated at 2′, FIGURE 3, to improve jigging action of the lure. The flexible side scoops may also be of varying conformations, as shown at 31 in FIGURES 6 and 7 it having been found that irregular edging of these scoops, as indicated, tends to create a greater vortex which, in turn, has an increased actuating effect on the movements of the tail 7 as the lure is pulled through the water. It has also been found that the flexible bottom plane is preferably split as shown at 4′ in FIGURES 4 and 5 because it reduces the torque on the inside of a turn thus keeping the lure stable and, by equalizing the torque, keeping the lure from rolling.

According to the preferred embodiment of this invention, referring in particular to FIGURES 1 and 2, the fins 6 and tail 7 are weighted on their outer edges 9, preferably by means of one or more added thicknesses of the material of which the lure is composed, these thickened areas preferably being roughened and, as previously pointed out, this may be accomplished by means of a plurality of undercut depressions 8 illustrated in FIGURE 1. It has been found that not only does this weighted edge reinforce the fins and tail, making them more lifelike, but it acts also as a drag stabilizer, helping to keep the line taut and it has the effect of causing instability in the tail so that the vortex created by the side scoops causes the weighted fins and tail to oscillate in a lifelike manner. Stated in another way, without the weighted edge, the tail goes to one side of the lure and appears to stay there.

The lure of this invention may readily be molded in a two piece mold of the desired fish-body shape employing any one of many moldable plastic materials such as Plastisol made by the Goodrich Rubber Company, colors, sparklers, fritters or like materials being added or embedded below the surface of the lure to give a lifelike scale effect. A hook or hooks and attachments may be readily embedded and molded into the lure during the molding operation and, similarly, the undercut depressions and weighted fins and tail may be impressed in the sides of the mold so that the completed lure may be obtained in one molding operation.

By reason of the nature of the molding material of the lure of this invention, fish oil, anise oil, or other scented oils may be mixed with other plasticizers and a scented porous, Plastisol lure may easily be obtained.

Due to the flexibility of the front flat scoop, the lure of this invention is very sensitive to direction of pull and pressure. Varied pulls and pressures produce differing actions, a slow retrieve tending toward more lifelike action whereas a fast retrieve tends to rock the lure.

The side scoops create vortexes along the sides of the lure, augmented by turbulences caused by the undercut depressions or scales, and these vortexes and turbulences in turn create or cause body, fin and tail movements of a most lifelike character. In addition, the flow turbulences caused by the undercut depressions or scales create noise in the high decibel range which has a tendency to attract fish.

The flat flexible bottom plane has the effect of acting as a hook guard and, under normal pull will gently rock the lure from side to side and, when the rod is jiggled will cause the lure to dive. If, as is preferred, this bottom plane is split in the center, it stabilizes lateral motion and, as previously pointed out, it keeps the lure stable on the inside of a turn.

All of the foregoing characteristics or advantages are pointed toward more lifelike action of the lure and, the more lifelike the greater the effectiveness as a bait or lure and the combination of these advantages as exemplified in this invention provide the marked improvement over the prior art which, as earlier described, is the object of this invention.

It will be apparent to those skilled in the art that various changes and modifications may be made without departing from the spirit or scope of this invention.

What is claimed is:
1. A fishing lure comprising a molded, resilient plastic body having the general appearance of a live fish and further characterized by having:

(1) an integrally formed flexible flat scoop extending forwardly from the head portion of said lure;
(2) unevenly set, forward pointing, concave scoops mounted on either side of said body and to the rear of said first flat scoop;
(3) a plurality of undercut depressions on the body portion of said lure in the general formation of fish scales;
(4) a fish hook imbedded in the body and an integrally formed, flexible plastic bottom plane guard for said fish hook; and
(5) integrally formed fin and tail portions which are weighted along their rear edges by reason of greater thickness than the main area of said fin and tail portions.

2. The lure of claim 1, which is scented by fish-attractive materials.

3. The lure of claim 1, in which the bottom plane guard is split into two substantially equal portions.

4. The lure of claim 1, in which the bottom plane guard is weighted in its rear area.

References Cited

UNITED STATES PATENTS

| 360,339 | 3/1887 | Cooke | 43—42.47 X |
| 973,479 | 10/1910 | Cooper | 43—42.24 X |
| 1,581,833 | 4/1926 | Bonnett | 43—42.47 X |
| 1,848,704 | 3/1932 | Farley | 43—42.34 X |
| 1,866,289 | 7/1932 | Boehm | 43—42.4 X |
| 2,218,280 | 10/1940 | Deering | 43—42.43 X |
| 2,277,453 | 3/1942 | Phillips | 43—42.22 |
| 2,515,103 | 7/1950 | Townsend | 43—42.47 |
| 2,531,738 | 11/1950 | Marsico | 43—42.42 X |
| 2,611,205 | 9/1952 | Steel | 43—42.47 X |
| 2,847,791 | 8/1958 | Simmons | 43—42.26 |
| 2,979,778 | 4/1961 | Fitzsimons | 43—42.06 X |

SAMUEL KOREN, *Primary Examiner.*

U.S. Cl. X.R.

43—17.1, 42.26, 42.28, 42.34, 42.39, 42.42, 42.47